US012803707B2

(12) United States Patent
Tan et al.

(10) Patent No.: US 12,803,707 B2
(45) Date of Patent: Nov. 17, 2026

(54) COMMUNICATION METHODS AND DEVICES

(71) Applicant: Siemens Aktiengesellschaft, Munich (DE)

(72) Inventors: Shuang Tan, Beijing (CN); Wan Li Ma, Beijing (CN); Jie Zhang, Beijing (CN); Li Wang, Beijing (CN); Mattias Lampe, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/108,530

(22) PCT Filed: Sep. 5, 2022

(86) PCT No.: PCT/CN2022/117081

§ 371 (c)(1),
(2) Date: Mar. 4, 2025

(87) PCT Pub. No.: WO2024/050666

PCT Pub. Date: Mar. 14, 2024

(65) Prior Publication Data

US 2026/0005797 A1 Jan. 1, 2026

(51) Int. Cl.
*H04L 1/08* (2006.01)

(52) U.S. Cl.
CPC .................................... *H04L 1/08* (2013.01)

(58) Field of Classification Search
CPC ................................. H04L 1/08; H04L 12/12
See application file for complete search history.

(56) References Cited

U.S. PATENT DOCUMENTS

| | | | |
|---|---|---|---|
| 2016/0226628 A1 | 8/2016 | Stephenne et al. | ........... 370/242 |
| 2019/0123933 A1 | 4/2019 | Mueller | |
| 2019/0159032 A1 | 5/2019 | Mueller | |

FOREIGN PATENT DOCUMENTS

| | | | | |
|---|---|---|---|---|
| CN | 105788212 A | * | 7/2016 | ............ G08C 17/02 |
| CN | 108702317 A | | 10/2018 | |

(Continued)

OTHER PUBLICATIONS

Extended European Search Report, Application No. 22957641.8, 10 pages, Dec. 1, 2025.

(Continued)

*Primary Examiner* — Farid Seyedvosoghi
(74) *Attorney, Agent, or Firm* — Slayden Grubert Beard PLLC

(57) ABSTRACT

Teachings herein include communication methods for a redundant communication system including two sending ends, two receiving ends, and a data source. An example includes: receiving a first copy of a data packet at the first end and receiving a second copy at the second end from the data source, wherein the first has a high priority label and the second has a low; sending the first copy from the first end to the first receiving end; retaining the second copy at the second end; receiving a confirmation message from the first receiving end at the first sending end and, in response, sending a success message to the second sending end and discarding the second copy; if the first sending end does not receive the confirmation message within a given time period, sending a failure message to the second sending end and, in response, sending the second copy to the second receiving end.

6 Claims, 6 Drawing Sheets

(56) References Cited

FOREIGN PATENT DOCUMENTS

| | | | | | |
|---|---|---|---|---|---|
| CN | 114019784 | A | | 2/2022 | |
| CN | 118714107 | A | * | 9/2024 | ............. H04L 47/30 |
| WO | WO-2022153077 | A1 | * | 7/2022 | ............... H04L 1/22 |

OTHER PUBLICATIONS

Search Report for International Application No. PCT/CN2022/117081, 11 pages, May 29, 2023.

* cited by examiner

COMMUNICATION METHODS AND DEVICES

CROSS-REFERENCE TO RELATED APPLICATIONS

This application is a U.S. National Stage Application of International Application No. PCT/CN2022/117081 filed Sep. 5, 2022, which designates the United States of America, the contents of which are hereby incorporated by reference in their entirety.

TECHNICAL FIELD

The present disclosure relates generally to communications. Various embodiments of the teachings herein include communication methods, communication devices, computing devices, and/or storage media.

BACKGROUND

Without modern communication technologies, the digital transformation currently taking place in industry would not be possible. To provide companies with the best infrastructure for exchanging data of various types, a series of special industrial wireless local area network (IWLAN) products have already been developed; these products have unique enhancement functions and can meet the specific requirements of industrial Wi-Fi in control cabinets, indoors and outdoors. Examples include iPRP (Industrial Parallel Redundancy Protocol) and iPCF (Industrial Point Coordination Function).

iPRP is an expansion of PRP (Parallel Redundancy Protocol), which transmits data wirelessly via an IWLAN. iPRP enables high-availability, redundant, uninterrupted and low-latency connections in a wireless network. It is based on copying a layer 2 frame on two independent (redundant) wireless links.

FIG. 1 shows a simplified schematic drawing of an IWLAN communication system using an iPRP protocol. In this system, all access points $AP_1$ and $AP_2$ and clients $STA_{1A}$ and $STA_{1B}$ have iPRP functionality enabled, or other features with similar functions realizing redundancy. Suppose that $STA_{1A}$ and $STA_{1B}$ are a pair of redundant WLAN client devices, connected to the same terminal device 101-1 (e.g. a typical Profinet IO (PNIO) device) via a "redundancy box 102-1", so the same level 2 services must be sent to/received from their respective access points ($AP_1$ and $AP_2$). This is also true of $STA_{2A}$ and $STA_{2B}$, which are connected to a terminal device 101-2 via a redundancy box 102-2.

For simplicity, it is assumed here that the two pairs of redundant clients are provided with service by the same pair of access points, i.e. AP1 and AP2 (in practice, the clients will be able to roam freely within a larger wireless network, so the mapping between the clients and the access points might be more complex and vary with time). As a further simplification, it can be assumed that all traffic is periodic PNIO traffic, and that all data frames have the same duration.

In a real IWLAN network, multiple APs might belong to different LAN networks, each terminal device can deploy one or two WLAN clients, and there will be a more complex correspondence between the APs and the clients.

SUMMARY

A brief summary of the present disclosure is given below, to provide a basic understanding of certain aspects thereof. It should be understood that this summary is not an exhaustive summary of the present disclosure. It is not intended to determine key or important parts, nor to define the scope thereof. Its sole purpose is to set out certain concepts in simplified form as a preamble to the more detailed description that follows. In view of the above, some embodiments of the teachings of the present disclosure include a communication method which, taking an existing iPRP communication method as a foundation, introduces additional conditions for the timing of sending of redundant data copies.

For example, some embodiments of the teachings herein include a communication method for a redundant communication system, the redundant communication system comprising a first sending end, a second sending end, a first receiving end, a second receiving end and a data source, wherein the first sending end and the second sending end respectively receive a first copy and a second copy of the same data packet from the data source, wherein the first copy has a high priority label, and the second copy has a low priority label, the first sending end sends the first copy to the first receiving end, and the second sending end retains the second copy; after receiving a "confirmation message" from the first receiving end, the first sending end sends to the second sending end a "success message" indicating that sending was successful, and the second sending end discards the second copy upon receiving the "success message"; if the first sending end does not receive a "confirmation message" within a first predetermined time period, it sends to the second sending end a "failure message" indicating that sending failed, and the second sending end sends the second copy to the second receiving end upon receiving the "failure message".

In some embodiments, the method further comprises the second sending end sending the second copy to the second receiving end, if the second sending end does not receive the "success message" and does not receive the "failure message" within a second predetermined time period.

In some embodiments, a mode of communication between the first sending end and the first receiving end, and a mode of communication between the second sending end and the second receiving end, comprise any one of WiFi, 5G and wired communication.

In some embodiments, the labels of the first copy and the second copy are marked in advance in at least one of the following ways: the first sending end is marked as a primary sending end, copies of data packets sent to the primary sending end and coming from the primary sending end are marked as high priority, the second sending end is marked as a secondary sending end, and copies of data packets sent to the secondary sending end and coming from the secondary sending end are marked as low priority; the first sending end and the second sending end are respectively marked as an "odd" sending end and an "even" sending end; when the number of a data packet is an odd number, copies coming from and sent to the "odd" sending end are marked as high priority, and copies coming from and sent to the "even" sending end are marked as low priority, and vice versa; one copy of the same data packet is marked as low/high priority and another copy of the same data packet is marked as low priority, in a random manner.

As another example, some embodiments include a communication method, comprising: a sending end receiving a copy of a data packet from a data source, checking whether a label of the copy is high priority or low priority; if the label of the copy is high priority: the sending end sending the copy to a corresponding receiving end; after receiving a "confirmation message" from the receiving end, the sending end sending, to another sending end having another copy of the same data packet, a "success message" indicating that sending was successful; if the sending end does not receive a "confirmation message" within a predetermined time period, sending to the other sending end a "failure message" indicating that sending failed; if the label of the copy is low priority: the sending end retaining the copy; discarding the copy when the sending end receives a "success message" from another sending end having another copy of the same data packet, and sending the copy to a corresponding receiving end when the sending end receives a "failure message" from the other sending end; if the sending end does not receive the "success message" and does not receive the "failure message" within a predetermined time period, the sending end sending the copy to the corresponding receiving end.

As another example, some embodiments include a communication device (500), comprising: a receiving unit (502), configured to receive a copy of a data packet from a data source, a priority judgment unit (504), configured to check whether a label of the copy is high priority or low priority; a transceiving unit (506); if the label of the copy is high priority, the transceiving unit (506) is configured to: send the copy to a corresponding receiving end; after receiving a "confirmation message" from the receiving end, send, to another sending end having another copy of the same data packet, a "success message" indicating that sending was successful; if no "confirmation message" is received within a predetermined time period, send to the other sending end a "failure message" indicating that sending failed; if the label of the copy is low priority, the transceiving unit (506) is configured to: retain the copy; discard the copy upon receiving a "success message" from another sending end having another copy of the same data packet, and send the copy to a corresponding receiving end upon receiving a "failure message" from the other sending end; send the copy to the corresponding receiving end if the "success message" is not received and the "failure message" is not received within a predetermined time period.

As another example, some embodiments include a computing device (600), comprising: at least one processor (602); and a memory (604) coupled to the at least one processor (602), the memory (604) being used to store instructions which, when executed by the at least one processor (602), cause the processor (602) to perform one or more of the methods as described herein.

As another example, some embodiments include a non-transitory machine-readable storage medium, storing executable instructions which, when executed, cause the machine to perform one or more of the methods as described herein.

As another example, some embodiments include a computer program product, tangibly stored on a computer-readable medium and comprising computer-executable instructions which, when executed, cause at least one processor to perform one or more of the the methods described herein.

BRIEF DESCRIPTION OF THE DRAWINGS

The above and other objectives, characteristics, and advantages of the teachings of the present disclosure are understood more easily with reference to the description of embodiments described below in conjunction with the drawings. The components in the drawings are merely intended to illustrate the principles described herein. In the drawings, identical or similar technical features or components will be represented with identical or similar reference signs. In the drawings.

Figure 1:
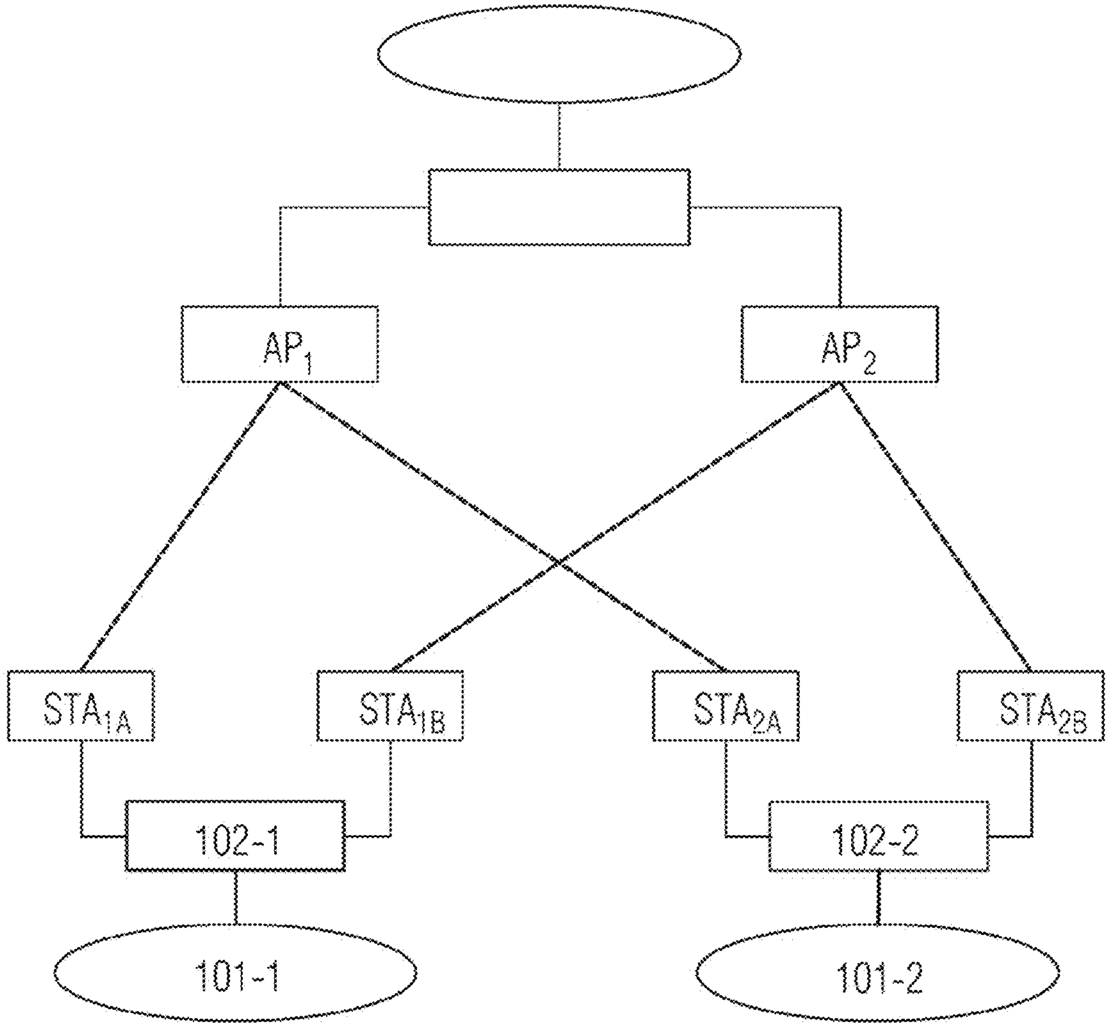
FIG. 1 is a simplified schematic drawing of an IWLAN communication system using an iPRP protocol in the prior art.

KEY TO THE DRAWINGS $AP_1$, $AP_2$: access point
101-1, 101-2: terminal device
$STA_{1A}$, $STA_{1B}$, $STA_{2A}$, $STA_{2B}$: client
102-1, 102-2: redundancy box
200: communication system
201: data source
203-1: first sending end
203-2: second sending end
204-1: first receiving end
204-2: second receiving end
205-1: first copy
205-2: second copy
300: communication method
S302, S304, S306, S308, S310: steps
400: communication method
S402, S404, S406, S408: steps
500: communication device
502: receiving unit
504: priority judgment unit
506: transceiving unit
600: computing device
602: processor
604: memory

DETAILED DESCRIPTION

Some embodiments of the teachings herein include a communication method for a redundant communication system comprising a first sending end, a second sending end, a first receiving end, a second receiving end and a data source, wherein: the first sending end and the second sending end respectively receive a first copy and a second copy of the same data packet from the data source, wherein the first copy has a high priority label, and the second copy has a low priority label, the first sending end sends the first copy to the first receiving end, and the second sending end retains the second copy; after receiving a "confirmation message" from the first receiving end, the first sending end sends to the second sending end a "success message" indicating that sending was successful, and the second sending end discards the second copy upon receiving the "success message"; if the first sending end does not receive a "confirmation message" within a first predetermined time period, it sends to the second sending end a "failure message" indicating that sending failed, and the second sending end sends the second copy to the second receiving end upon receiving the "failure message". In this way, unnecessary redundant transmission can be reduced, and data throughput can be increased; at the same time, if sending of the first copy fails, it can be ensured that the second copy is sent to the receiving end.

In some embodiments, the method further comprises: the second sending end sending the second copy to the second receiving end, if the second sending end does not receive the "success message" and does not receive the "failure message" within a second predetermined time period. In this way, even if packet loss occurs, normal transmission of data copies can be ensured.

In some embodiments, a mode of communication between the first sending end and the first receiving end, and a mode of communication between the second sending end and the second receiving end, comprise any one of WiFi, 5G and wired communication. In this way, the communication method according to the present disclosure can be used between redundant links using any two modes of communication.

In some embodiments, the labels of the first copy and the second copy are marked in advance in at least one of the following ways: the first sending end is marked as a primary sending end, copies of data packets sent to the primary sending end and coming from the primary sending end are marked as high priority, the second sending end is marked as a secondary sending end, and copies of data packets sent to the secondary sending end and coming from the secondary sending end are marked as low priority; the first sending end and the second sending end are respectively marked as an "odd" sending end and an "even" sending end; when the number of a data packet is an odd number, copies coming from and sent to the "odd" sending end are marked as high priority, and copies coming from and sent to the "even" sending end are marked as low priority, and vice versa; one copy of the same data packet is marked as low/high priority and another copy of the same data packet is marked as low priority, in a random manner. In this way, two copies of the same data packet can be marked in different ways according to different network conditions and communication demands.

Some embodiments include a communication method comprising: a sending end receiving a copy of a data packet from a data source, checking whether a label of the copy is high priority or low priority; if the label of the copy is high priority: the sending end sending the copy to a corresponding receiving end; after receiving a "confirmation message" from the receiving end, the sending end sending, to another sending end having another copy of the same data packet, a "success message" indicating that sending was successful; if the sending end does not receive a "confirmation message" within a predetermined time period, sending to the other sending end a "failure message" indicating that sending failed; if the label of the copy is low priority: the sending end retaining the copy; discarding the copy when the sending end receives a "success message" from another sending end having another copy of the same data packet, and sending the copy to a corresponding receiving end when the sending end receives a "failure message" from the other sending end; if the sending end does not receive the "success message" and does not receive the "failure message" within a predetermined time period, the sending end sending the copy to the corresponding receiving end.

Some embodiments of the teachings herein include a communication device comprising: a receiving unit, configured to receive a copy of a data packet from a data source, a priority judgment unit, configured to check whether a label of the copy is high priority or low priority; a transceiving unit; if the label of the copy is high priority, the transceiving unit is configured to: send the copy to a corresponding receiving end; after receiving a "confirmation message" from the receiving end, send, to another sending end having another copy of the same data packet, a "success message" indicating that sending was successful; if no "confirmation message" is received within a predetermined time period, send to the other sending end a "failure message" indicating that sending failed; if the label of the copy is low priority, the transceiving unit is configured to: retain the copy; discard the copy upon receiving a "success message" from another sending end having another copy of the same data packet, and send the copy to a corresponding receiving end upon receiving a "failure message" from the other sending end; send the copy to the corresponding receiving end if the "success message" is not received and the "failure message" is not received within a predetermined time period.

Some embodiments of the teachings of the present disclosure include a computing device comprising: at least one processor; and a memory coupled to the at least one processor, the memory being used to store instructions which, when executed by the at least one processor, cause the processor to perform one or more of the methods described herein.

Some embodiments of the teachings of the present disclosure include a non-transitory machine-readable storage medium storing executable instructions which, when executed, cause the machine to perform one or more of the methods described herein.

Some embodiments of the teachings of the present disclosure include a computer program comprising computer-executable instructions which, when executed, cause at least one processor to perform one or more of the methods described herein.

Some embodiments of the teachings of the present disclosure include a computer program product is tangibly stored on a computer-readable medium and comprising computer-executable instructions which, when executed, cause at least one processor to perform one or more of the methods described herein.

In some embodiments, the redundant copy of the data packet is not sent before the result of a first attempt in one of the links is obtained. Such a solution avoids unnecessary redundancy to the maximum extent possible, makes full use of precious wireless resources, and greatly increases data throughput.

The subject matter described herein is now discussed with reference to exemplary embodiments. It should be understood that the sole purpose of discussing these embodiments is to enable those skilled in the art to better understand and thereby implement the subject matter described herein, without limiting the protection scope, applicability or examples expounded in the claims. Changes may be made to the functions and arrangement of the discussed elements without departing from the scope of protection of the content disclosed herein. Various processes or components may be omitted from, replaced in or added to various examples as required. For example, the described method may be performed in a different order from that described, and various steps may be added, omitted or combined. Furthermore, features described in relation to some examples may also be combined in other examples.

As used herein, the term "comprising" and variants thereof denote open terms meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, whether explicit or implicit. Unless clearly indicated in the context, the definition of a term is the same throughout the description.

A basic feature of iPRP In conventional iPRP communication in a WLAN is that, after receiving confirmation of successful sending of a downlink data packet, an access point (AP) will notify a redundant access point that sending was successful, so that the redundant access point can delete the corresponding data packet from its sending queue, to avoid wasting time and radio resources due to repeated transmission. However, by default, there is no coordination mechanism and no synchronization between access points. For this reason, when two access points send/receive data to/from a client (STA), the following two data transmission modes may arise.

The first is the case where there is no time overlap in the sending of two copies of the same data packet; this feature will result in data being successfully transmitted by the access point $AP_A$ and thus discarded by the access point $AP_B$, so $AP_B$ can use this timeslot to transmit another piece of data. The second is the case where there is time overlap in the sending of two copies of the same data packet; in this case, the situation just described cannot be realized, because before transmission on the first link is complete, the other copy of the same data packet has already been transmitted on the redundant link.

In conventional iPRP, the transmission of redundant data packets can take place at any time on access points (AP) or clients (STA). Based on the analysis above, if the data sending behavior of APs can be coordinated, unnecessary redundant transmission can be reduced, and data throughput can be increased. The communication process in conventional iPRP is as follows.

At a sending end, a PRP Box (redundancy box) can copy each data packet, and send them to a corresponding AP belonging to each LAN. At a receiving end, when a copy of a data packet is successfully received, confirmation will be sent to the sending side; if it is already received, the other copy of the same data packet will be ignored. At the same time, if the other copy has not yet been sent, the sending end will stop the sending, and delete the data packet after receiving confirmation. The two APs or STAs responsible for sending the same data packet will send data at any time, and if both transmissions are successful, wastage of radio resources is unavoidable.

To utilize radio resources effectively and increase data throughput, the present disclosure proposes a communication method, which introduces some additional transmission time dependency between iPRP redundant data packets. In the description of the present disclosure, a WLAN communication system is used as an example, but those skilled in the art will understand that the communication method according to the present disclosure can be used in any system that uses a redundancy mechanism for communication, in order to reduce unnecessary redundant transmission and increase data throughput; there is no restriction to a WLAN communication system.

Figure 2:
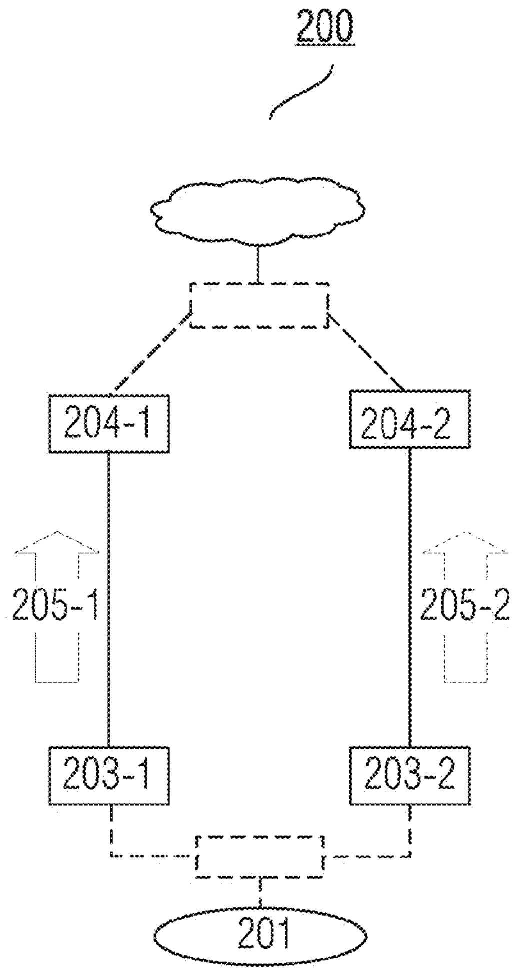
FIG. 2 is a simplified schematic drawing of a communication system that performs communication using a communication method incorporating teachings of the present disclosure.

An example communication method incorporating teachings of the present disclosure is realized in a communication system that uses a redundancy mechanism for communication. FIG. 2 shows a simplified schematic drawing of the redundant communication system. In FIG. 2, the communication system 200 comprises a first sending end 203-1, a second sending end 203-2, a first receiving end 204-1, a second receiving end 204-2 and a data source 201. The second sending end is a redundant sending end for the first sending end, the second receiving end is a redundant receiving end for the first receiving end, and the same data from the data source is copied as two copies 205-1 and 205-2. For example, the two data copies may be produced by means of a hardware PRP Box (redundancy box); in the method of the present disclosure, the way in which the two data copies are produced is not defined and not described in further detail here. The first copy 205-1 is transmitted between the first sending end and the first receiving end; the other, second copy 205-2 is transmitted if necessary between the second sending end and the second receiving end. In FIG. 2, only one pair of redundant sending ends and one pair of redundant receiving ends in the communication system are used as an example to explain the communication method according to the present disclosure; a real communication system may comprise any number of multiple pairs of sending ends and receiving ends, wherein the communication method according to the present disclosure can be used for communication between each pair of sending ends and receiving ends.

In an IWLAN, the data source may be any terminal device in the industrial sector, such as a PLC, AGV, gateway or other device, in which case the sending end is a client, and the receiving end is a server or cloud; the data source may also be a server, in which case the sending end is an access point, and the receiving end is a client. That is to say, in the method here, the sending end may be an uplink sending end or a downlink sending end, and the other end of the communication is the receiving end. For simplicity, only basic components in the method steps for realizing the present invention are marked.

Figure 3:
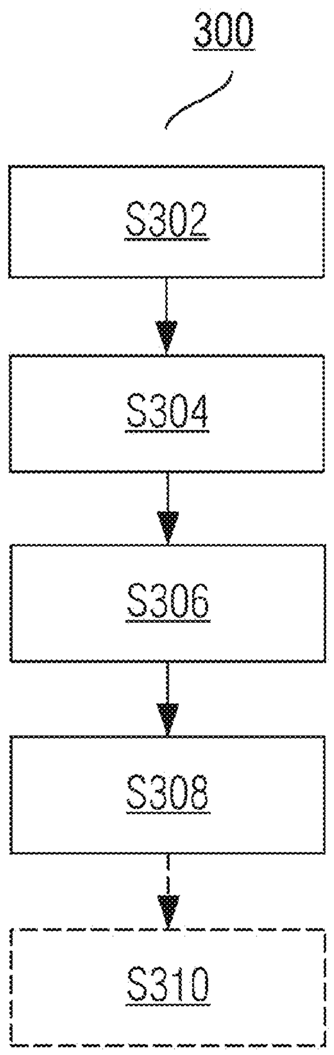
FIG. 3 is a flow chart of an exemplary process of a communication method incorporating teachings of the present disclosure.

FIG. 3 is a flow chart of an exemplary process of a communication method 300 incorporating teachings of the present disclosure. The steps performed in the communication method 300 are described in detail below with reference to FIG. 3.

Firstly, in step S302, a first sending end and a second sending end respectively receive a first copy and a second copy of the same data packet from a data source, wherein the first copy has a high priority label, and the second copy has no label or has a low priority label. A priority label is added to each copy of the data packet for the purpose of distinguishing between the two copies; in the following steps, the copy with high priority will be sent first, and the copy with low priority is not sent for the time being.

Specifically, labels may be added to the copies of the data in one of the following ways.

Method 1: two sending ends connected to the same terminal device are predefined as a "primary" sending end and a "secondary" sending end. A data copy sent to the "primary" sending end and a data copy coming from the "primary" sending end are marked with a "primary" label; a data copy sent to the "secondary" sending end and a data copy coming from the "secondary" sending end are marked with a "secondary" label or may have no label added to them.

Here, the "primary" label indicates that the copy has high priority, whereas the other copy of the same piece of data has low priority. The "primary" clients are better distributed in different networks, to avoid load imbalance between networks. According to the example in the figure, STA1B, STA2A and STA3A may be chosen as "primary" sending ends.

Method 2: two sending ends connected to the same terminal device are predefined as an "odd" sending end and an "even" sending end. When the number of a data packet coming from the terminal device is an odd number, a data copy sent to the "odd" sending end and a data copy coming from the "even" sending end are marked with a "primary" label, and another copy is marked with a "secondary" label. When the number of a data packet is an even number, a data copy sent to the "even" sending end and a data copy coming from an "even" client are marked with a "primary" label, and another copy is marked with a "secondary" label.

When the number of terminal devices in the network is very small but each terminal device requires a high throughput, this method has higher efficiency, and is able to make full use of the two links to simultaneously transmit two independent data streams.

Method 3: one copy is marked with a "primary" label and the other is marked with a "secondary" label in a random manner.

In the methods above, hardware (e.g. a PRP Box) is used to add a label to the data copy before the data of the data source is sent to the sending end, but the following method may also be used: the PRP Box does not perform marking with "primary/secondary" labels, and instead, the sending end can determine a label category according to a predefined global rule implemented in all of the sending ends.

An example is as follows. Two sending ends connected to the same data source are predefined as an "even" sending end and an "odd" sending end. When the number of a data packet is an even number, a data copy sent to an "even" client and a data copy coming from the "even" client are marked with a "primary" label, and another copy is marked with a "secondary" label. When the number of a data packet is an odd number, a data copy sent to an "odd" client and a data copy coming from the "odd" client are marked with a "primary" label, and another copy is marked with a "secondary" label.

There are no restrictions on the specific way in which labels are added to the two copies of the data packet, as long as the two copies are able to be distinguished from one another; thus, one of the sending ends sends a copy of the data, and the other sending end does not send a copy of the data for the time being. To facilitate explanation herein, the copy with high priority is called the first copy, the sending end that sends the first copy is called the first sending end, the copy with low priority is called the second copy, and the sending end that sends the second copy is called the second sending end. It will be understood that the first sending end and the second sending end do not specifically mean a particular sending end, and the first copy and the second copy do not specifically mean a particular copy.

In step S304, the first sending end sends the first copy to the first receiving end, and the second sending end retains the second copy. The copy marked with high priority (the first copy) is sent by the first sending end to the corresponding first receiving end, and the copy with low priority of the same data packet (the second copy) is retained by the second sending end and not sent.

In step S306, after receiving a "confirmation message" from the first receiving end, the first sending end sends to the second sending end a "success message" indicating that sending was successful, and the second sending end discards the second copy upon receiving the "success message". If the first sending end successfully sends the first copy of the data to the first receiving end, the second sending end discards the second copy and does not send it.

In step S308, if the first sending end does not receive a "confirmation message" within a first predetermined time period, it sends to the second sending end a "failure message" indicating that sending failed, and the second sending end sends the second copy to the second receiving end upon receiving the "failure message". If sending by the first sending end fails, the second sending end sends the second copy to the second receiving end. In this way, unnecessary redundant transmission can be reduced, and data throughput can be increased; at the same time, it can be ensured that the second copy is sent to the receiving end if sending of the first copy fails.

In an example, the communication method 300 may also comprise step S310: if the second sending end does not receive the "success message" and does not receive the "failure message" within a second predetermined time period, the second sending end sends the second copy to the second receiving end. In this case, data loss may have occurred at some stage, so in order to ensure data transmission, the second sending end sends the second copy to the second receiving end if the second sending end does not receive any message within the second predetermined time period.

The first predetermined time and the second predetermined time may be set in advance as needed, and may be set to be equal or unequal. In addition, if data received from the data source has no label, it is sent according to the sending method of the conventional PRP protocol, which is not described in further detail here.

The method of communication between the first sending end and the first receiving end, and the method of communication between the second sending end and the second receiving end, include any one of WiFi, 5G and wired communication. The mode of communication between the sending end and the receiving end may be wireless communication or communication; wired and the mode of communication between the sending end and the receiving end in one of the two pairs may be the same as or different from the mode of communication between the sending end and the receiving end in the other pair.

Figure 4:
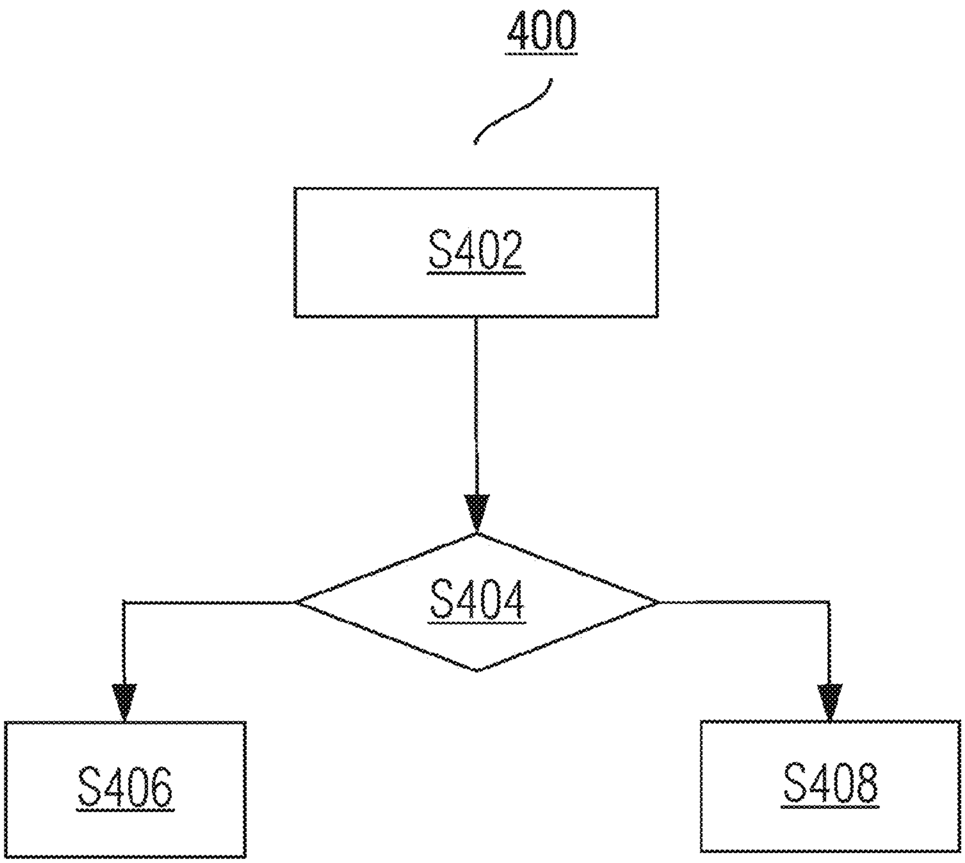
FIG. 4 is a flow chart of an exemplary process of a communication method performed at a sending end incorporating teachings of the present disclosure.

FIG. 4 is a flow chart of an exemplary process of a communication method performed at a sending end incorporating teachings of the present disclosure. Operations performed at a sending end when the sending end receives a copy of a data packet is described below with reference to FIG. 4.

Firstly, in step S402, a sending end receives a copy of a data packet from a data source.

Next, in step S404, a check is performed to determine whether a label of the copy is high priority or low priority.

If the label of the copy is high priority, the operation of step S406 is performed: the sending end sends the copy to a corresponding receiving end; after receiving a "confirmation message" from the receiving end, the sending end sends, to another sending end having another copy of the same data packet, a "success message" indicating that sending was successful; if the sending end does not receive a "confirmation message" within a predetermined time period, it sends to the other sending end a "failure message" indicating that sending failed.

If the label of the copy is low priority, the operation of step S408 is performed: the sending end retains the copy; when the sending end receives a "success message" from another sending end having another copy of the same data packet, it discards the copy, and when the sending end receives a "failure message" from the other sending end, it sends the copy to a corresponding receiving end; if the sending end does not receive the "success message" and does not receive the "failure message" within a predetermined time period, the sending end sends the copy to the corresponding receiving end.

Figure 5:
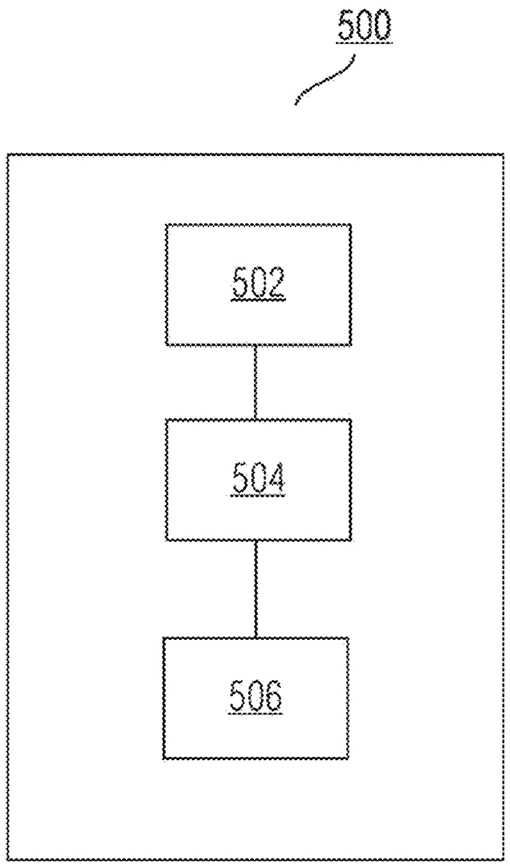
FIG. 5 shows a block diagram of an exemplary configuration of a communication device for performing the communication method shown in FIG. 4.

FIG. 5 shows a block diagram of an exemplary configuration of a communication device 500 for performing the communication method shown in FIG. 4. In FIG. 5, the communication device 500 comprises: a receiving unit 502, a priority judgment unit 504 and a transceiving unit 506.

The receiving unit 502 is configured to receive a copy of a data packet from a data source.

The priority judgment unit 504 is configured to check whether a label of the copy is high priority or low priority.

If the label of the copy is high priority, the transceiving unit 506 is configured to:

send the copy to a corresponding receiving end;

after receiving a "confirmation message" from the receiving end, send, to another sending end having another copy of the same data packet, a "success message" indicating that sending was successful;

if no "confirmation message" is received within a predetermined time period, send to the other sending end a "failure message" indicating that sending failed;

if the label of the copy is low priority, the transceiving unit 506 is configured to:

retain the copy;

discard the copy upon receiving a "success message" from another sending end having another copy of the same data packet, and send the copy to the corresponding receiving end upon receiving a "failure message" from the other sending end;

send the copy to the corresponding receiving end if the "success message" and the "failure message" are not received within a predetermined time period.

In some embodiments, the various elements of the communication method described above and the various component modules and/or units of the communication device described above may be implemented as software, firmware, hardware or a combination thereof. In the case of implementation by software or firmware, a program constituting software for implementing the method can be installed on a computing device having a dedicated hardware structure from a storage medium or a network; when installed with various programs, the computing device is able to perform various functions, etc.

It should be explained that the structure of the communication device 500 shown in FIG. 5 and its component units are merely exemplary; those skilled in the art can modify the structural block diagram shown in FIG. 5 as needed. The details of the functions and operations of the various parts of the communication device 500 and the communication method 400 may for example be the same as or similar to the relevant parts in the embodiments of the communication method of the present disclosure described with reference to FIGS. 1-3 and are not described in further detail here.

In some embodiments, the redundant copy of the data packet is not sent before the result of a first attempt in one of the links is obtained. Such a solution avoids unnecessary redundancy to the maximum extent possible, makes full use of precious wireless resources, and greatly increases data throughput. Embodiments of the communication device and the communication method according to embodiments of the present disclosure have been described above with reference to FIGS. 1-5. The various units of the communication device described above may be realized using hardware, software, or a combination of software and hardware.

Figure 6:
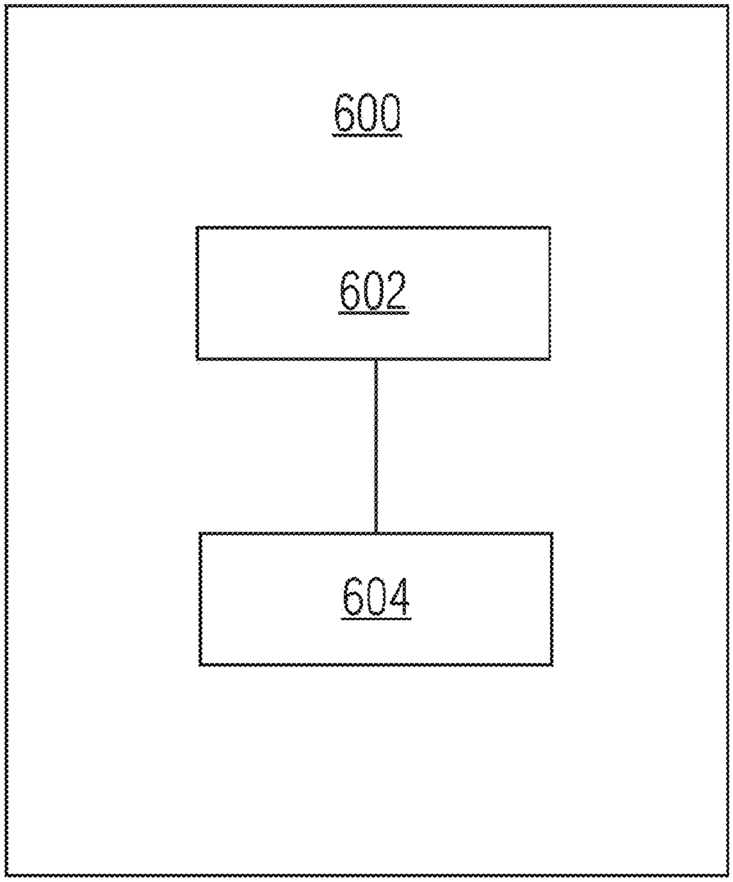
FIG. 6 shows a block diagram of a computing device incorporating teachings of the present disclosure for realizing a communication method.

FIG. 6 shows a block diagram of a computing device 600 incorporating teachings of the present disclosure for realizing a communication method. In some embodiments, the computing device 600 may comprise at least one processor 602, wherein the processor 602 executes at least one computer-readable instruction (i.e. the abovementioned element realized as software) which is stored or encoded in a computer-readable storage medium (i.e. a memory 604).

In some embodiments, a computer-executable instruction is stored in the memory 604, wherein the computer-executable instruction, when executed, enables the at least one processor 602 to complete an operation performed by a data relay apparatus. In addition, a computer-executable instruction enabling the processor 602 to complete an operation performed by a container management apparatus may also be stored in the memory 604. The computer-executable instructions stored in the memory 604, when executed, cause the at least one processor 602 to perform the various operations and functions described above with reference to FIGS. 1-5 in various embodiments of the present disclosure.

In some embodiments, a non-transitory machine-readable medium may have machine-executable instructions (i.e. the abovementioned element realized as software) which, when executed by a machine, cause the machine to perform the various operations and functions described above with reference to FIGS. 1-5 in various embodiments of the present disclosure.

In some embodiments, a computer program comprises computer-executable instructions which, when executed, cause at least one processor to perform the various operations and functions described above with reference to FIGS. 1-5 in various embodiments of the present disclosure.

In some embodiments, a computer program product comprises computer-executable instructions which, when executed, cause at least one processor to perform the various operations and functions described above with reference to FIGS. 1-5 in various embodiments of the present disclosure.

The specific embodiments expounded above with reference to the drawings describe exemplary embodiments, but do not represent all embodiments that can be realized or that fall within the scope of protection of the claims. The term "exemplary" used throughout this Description means "serving as an example, instance or illustration", and does not mean "preferred" or "advantageous" compared to other embodiments. In order to provide an understanding of the technologies described, specific embodiments include specific details. However, these technologies may be implemented in the absence of these specific details. In some instances, to avoid making the concepts of the described embodiments difficult to understand, well known structures and apparatuses are shown in the form of block diagrams.

The above description of the content of the present disclosure is provided to enable any person skilled in the art to realize or use the content of the present disclosure. To a person skilled in the art, various modifications to the content of the present disclosure will be obvious, and the general principles defined herein may be applied to other variants without departing from the scope of protection of the content of the present disclosure. Thus, the content of the present disclosure is not limited to the examples and designs described herein but is consistent with the broadest scope conforming to the principles and novel features disclosed herein.

The above are merely example embodiments of the teachings of the present disclosure, which are not intended to limit it. Any modifications, equivalent substitutions, or improvements, etc. made within the spirit and principles of the present disclosure should be included in the scope of protection thereof.

What is claimed is:

1. A communication method for a redundant communication system including a first sending end, a second sending end, a first receiving end, a second receiving end, and a data source, the method comprising:

receiving a first copy of a data packet at the first sending end and receiving a second copy of the data packet at the second sending end respectively from the data source, wherein the first copy has a high priority label and the second copy has a low priority label;

sending the first copy from the first sending end to the first receiving end;

retaining the second copy at the second sending end;

receiving a confirmation message from the first receiving end at the first sending end and, in response, sending a success message to the second sending end, the success message indicating sending was successful and, in response, discarding the second copy;

when the first sending end does not receive the confirmation message within a first predetermined time period, sending a failure message to the second sending end, the failure message indicating sending failed and, in response, sending the second copy to the second receiving end.

2. The method as claimed in claim 1, further comprising sending the second copy to the second receiving end when the second sending end does not receive the success message and does not receive the failure message within a second predetermined time period.

3. The method as claimed in claim 1, wherein communication between the first sending end and the first receiving end, and communication between the second sending end and the second receiving end, each comprise any one of WiFi, 5G, and wired communication.

4. The method as claimed in claim 1, wherein the labels of the first copy and the second copy are marked in advance in at least one of the following ways:

the first sending end is marked as a primary sending end, copies of data packets sent to the primary sending end and coming from the primary sending end are marked as high priority, the second sending end is marked as a secondary sending end, and copies of data packets sent to the secondary sending end and coming from the secondary sending end are marked as low priority;

the first sending end and the second sending end are respectively marked as an "odd" sending end and an "even" sending end; when the number of a data packet is an odd number, copies coming from and sent to the "odd" sending end are marked as high priority, and copies coming from and sent to the "even" sending end are marked as low priority, and vice versa;

one copy of the same data packet is marked as low/high priority and another copy of the same data packet is marked as low priority, in a random manner.

5. A communication method comprising:

a sending end receiving a copy of a data packet from a data source, checking whether a label of the copy is high priority or low priority;

when the label of the copy is high priority:

the sending end sending the copy to a corresponding receiving end;

after receiving a "confirmation message" from the receiving end, the sending end sending, to another sending end having another copy of the same data packet, a "success message" indicating that sending was successful;

when the sending end does not receive a "confirmation message" within a predetermined time period, sending to the other sending end a "failure message" indicating that sending failed;

when the label of the copy is low priority:

the sending end retaining the copy;

discarding the copy when the sending end receives a "success message" from another sending end having another copy of the same data packet, and sending the copy to a corresponding receiving end when the sending end receives a "failure message" from the other sending end;

when the sending end does not receive the "success message" and does not receive the "failure message" within a predetermined time period, the sending end sending the copy to the corresponding receiving end.

6. A communication device comprising:

a receiving unit to receive a copy of a data packet from a data source, a priority judgment unit to check whether a label of the copy is high priority or low priority; and a transceiving unit;

wherein the transceiving unit is configure to:

when the label of the copy is high priority:

send the copy to a corresponding receiving end;

after receiving a "confirmation message" from the receiving end, send, to another sending end having another copy of the same data packet, a "success message" indicating that sending was successful; and when no "confirmation message" is received within a predetermined time period, send to the other sending end a "failure message" indicating that sending failed;

when the label of the copy is low priority:

retain the copy;

discard the copy upon receiving a "success message" from another sending end having another copy of the same data packet, and send the copy to a corresponding receiving end upon receiving a "failure message" from the other sending end; and send the copy to the corresponding receiving end when the "success message" is not received and the "failure message" is not received within a predetermined time period.

* * * * *